Oct. 28, 1958    I. B. AUGUSTIN    2,857,598
SUN GOGGLES
Filed Sept. 19, 1955
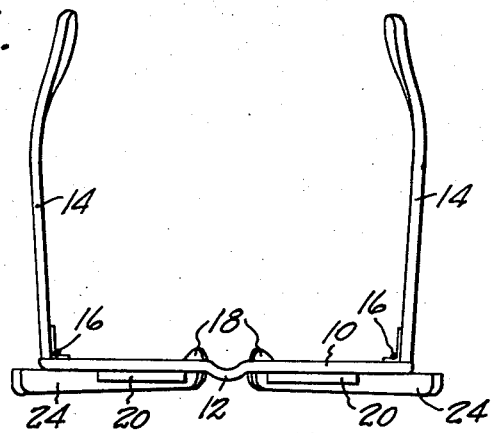
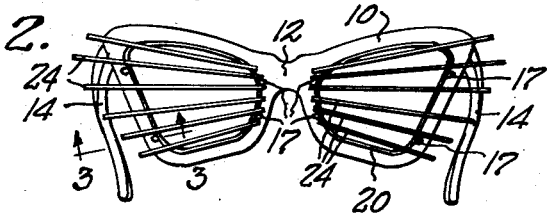
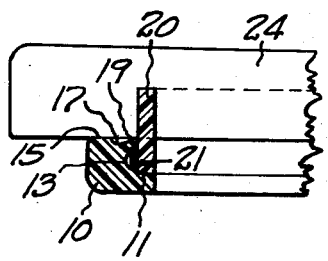
IRMGARD B. AUGUSTIN.
INVENTOR.
BY
Eugene C. Knoblock
ATTORNEY.

2,857,598
SUN GOGGLES

Irmgard B. Augustin, South Bend, Ind.

Application September 19, 1955, Serial No. 535,019

3 Claims. (Cl. 2—14)

This invention relates to improvements in sun goggles, and more particularly to sun goggles of the type disclosed in my copending patent application, Ser. No. 470,746, filed November 23, 1954, now abandoned, which do not use lens but which employ, instead, slats or bars which intercept light tending to impinge upon the eyes at an angle to the normal line of vision.

The primary object of this invention is to provide sun goggles of this type which can be constructed from sub-assemblies of desired individual construction and color and from which can be assembled, readily and without the use of tools, completed sun goggles having the desired shape and color characteristics.

A further object is to provide sun goggles of this character having a primary frame consisting of two eye frames connected by a bridge portion and mounting bows for anchoring the same to the head, and a pair of slat units each having an endless rim mounting a plurality of slats, each adapted to seat in a socket in the main frame and to be detachably interlocked therein.

Other objects will be apparent from the following specification.

In the drawing:

Fig. 1 is a top plan view of the goggles;

Fig. 2 is a front plan view of the goggles; and

Fig. 3 is an enlarged fragmentary sectional view taken on line 3—3 of Fig. 2.

Referring to the drawing which illustrates the preferred embodiment of the invention, the numeral 10 designates the eye frames or rims of the goggles which are of any shape and construction desired, and through which the wearer looks while wearing the goggles. The eye frames 10 are connected by a suitable bridge or nose piece 12 of any shape and configuration desired and of the type well known in the art adapted to span the bridge of the nose and to permit positioning of the eye frames normal to the face at opposite sides of the nose and in proper position to permit the wearer to have a normal line of vision substantially through the center of the apertures of the eye frames 10. Any suitable means may be provided to support the goggles upon the head, and, as here shown, temples or bows 14 are pivotally connected to the opposite outer sides of the eye frames 10 by means of the hinges 16, said bows or temples being of any shape found desirable and usually fitting alongside the head of the wearer and above the ears to properly orient the frame relative to the wearer's head. Nose pads 18 will preferably be provided on each frame 10 at the inner portion thereof adjacent the bridge 12 and adapted to bear upon the nose of the wearer in such a fashion that they cooperate with the bows 14 to mount and position the goggles.

The inner edge of each eye frame 10 is stepped to provide an inwardly projecting shoulder or abutment 11 at the rear thereof, so that each eye frame has a socket therein which is open at its front. The shoulder 11 is preferably continuous. At a plurality of spaced points each socket is interrupted by a recess 13 spaced from the outer surface 15 of the eye frame. These recesses 13 may be formed in any manner found suitable, but in cases where the eye frames are molded from thermoplastic material, I prefer to form a groove in the socket perpendicular to and open at the outer surface 15 and extending adjacent to shoulder 11, the open end of which groove is then pressed by a heated member to indent the surface 15 at 17 and form a shoulder 19 across the upper end of the groove.

In each of the eye frames 10 is detachably mounted an insert unit having a flange or rim 20, preferably of endless character, located and extending around the inner periphery of each eye frame and preferably conforming in shape to the shape of the opening in the eye frame 10. The flange 20 is preferably formed of material of substantially uniform width and thickness, which is bent to conform to the shape of the frame 10. The flange 20 may be preformed to substantially endless shape, as illustrated, and will be positioned with its width substantially parallel to the line of vision of the wearer. The flange 20 is formed separately from the eye frame 10. The flange 20 fits snugly within the opening and preferably bears against the shoulder 11 and has a projection 21 registering with and seating in each recess 13, as by snapping the same past the shoulder 19 at the outer end of each socket 13. The width of the flange 20 will be such that a portion thereof projects outwardly beyond the plane of the front surface of the eye frame as illustrated in Fig. 3.

The flange 20 is notched at spaced points thereof and preferably adjacent the inner and outer portions of each eye frame. The notches are so arranged and oriented as to receive end portions of slats 24. At least the inner edges of the slats 24 will be substantially straight, as shown, and as here illustrated, the members 24 may be of substantially uniform width throughout their length. The width of each slat will be greater than the width of the projecting portion of the flange 20 in the preferred form of the invention as illustrated in Fig. 3, so that the outer edges of the slats 24 project in spaced relation to the eye frame 10 and the flange 20. Notches in the flange 20 will preferably be of a depth equal to the width of the projecting portion of the flange 20 so that the rear or inner edges of the slats 24 will bear against the front surface of the eye frame 10. Each of the slats 24 will be supported at two spaced points by notches in the flange 20, as illustrated in Fig. 2. The inner ends of the slats 24 will preferably terminate adjacent to the flange 20 while the outer end portions of said slats will project outwardly at any desired distance from the outer portion of the flange 20 and from the eye frame 10. Thus the inner ends of the slats are located clear of the wearer's nose. The outer ends of the slats, however, may extend clear of the eye frames 10, as illustrated in Fig. 2, to provide protection against light tending to strike the eyes when directed in a path at an angle to the line of vision and passing between the face of the wearer and the eye frame. The slats 24 may be arranged in any manner found suitable, although generally they will preferably be positioned horizontally. As shown in Fig. 2, the slats preferably converge toward their inner ends and are of unequal length to produce an overall appearance or shape which is decorative. Slats 24 will be anchored in the frame notches in any manner found suitable, as by means of glue, bonding material, or fastener members.

It will be understood that, while the positioning of the slats in notches formed in the flange 20 is preferred, other positioning means may be employed. Thus I contemplate that notches may be formed in the slats instead of in the flanges 20, or that half-notches may be formed in each of the slat and the flange. The slats will be permanently secured to the flanges 20 to define subassemblies or units.

It will be understood that the device may be formed of any material found suitable. Thus I prefer to employ plastic material for the slats 24 but the same may be formed of metal. Similarly, the flange 20, the eye frame 10 and other parts may be formed of plastic, metal or any other suitable material characterized by form retention or rigidity and adequate strength in thin sections to reduce to a minimum the dimension of the slats which is viewed by the wearer. Each of the frame units and the slatted insert units may be made of a selected color or colors.

One of the principal advantages of this construction is that a very wide range of color combinations may be provided from a comparatively small stock of component parts. Thus a dealer may carry a stock of main frame units of different colors and a stock of insert units of different colors. The purchaser may select any color combination desired from this stock, the number of which combinations is much larger than the number of individual units or parts which the dealer stocks. Thus economy of stock is secured without sacrifice of varieties of color combinations available. Also, the purchaser may have the same wide selection determined by the permutation of the number of color combinations available, seeing all combinations desired by simply installing and removing inserts until a selection is made.

Another advantage is that a purchaser may purchase one or two main frames and a plurality of sets of insert units of different colors to match, blend with or complement different costumes. Thus a small supply of parts permits a user to secure, economically, a wide range of color combinations and costume accessories.

The snap lock feature described serves to hold the unit inserts in the main frame very effectively while the goggles are being worn. Also, it is provided by low cost manufacture and is subject to no substantial wear over a long period of time despite repeated mounting of insert units in the main frame and removal thereof from the main frame. In this connection, the parts are made of such materials, cross sectional dimensions and proportions that they yield to the slight extent necessary to effect the snap lock and to disengage the same without damage, weakening or loosening of the lock after repeated manipulations.

While the preferred embodiment of the invention has been illustrated and described herein, it will be understood that the invention may take other forms and embodiments within the scope of the appended claims.

I claim:
1. Sun goggles comprising a main frame unit constituting eye frames, bows and a nose bridge, each eye frame having a sight opening, and a pair of insert units each constituting an endless rim seating detachably in one of said respective eye frame openings and a plurality of slats fixedly secured to and extending across and projecting beyond said frame at one end portion and positioned edgewise relative to the line of vision of a wearer of the goggles each eye frame sight opening being stepped to define a shoulder therein and said insert unit rims substantially conforming in shape to and fitting in the large dimension portions of said sight openings and bearing against said shoulders, the inner longitudinal edges of said slats being spaced from the inner edge of said rim a distance substantially equal to the spacing of said frame shoulder from the front surface of said eye frame.

2. Sun goggles comprising a main frame unit constituting eye frames, bows and a nose bridge, each eye frame having a sight opening of stepped contour defining a shoulder therearound, and a pair of insert units each constituting an endless rim substantially conforming to the shape of and seating detachably in one of said respective eye frame openings to bear on said shoulder and a plurality of slats fixedly secured to and extending across and overlying said rim at one end portion and positioned edgewise relative to the line of vision of a wearer of the goggles, the inner edges of said slats being positioned adjacent the outer faces of said eye frames and a plurality of spaced interengaging snap lock means carried by each eye frame and each insert unit.

3. Sun goggles as defined in claim 2, wherein said snap lock means are located adjacent points of connection between said rim and slats.

References Cited in the file of this patent
UNITED STATES PATENTS

| | | |
|---|---|---|
| 2,212,945 | Lehrfeld | Aug. 27, 1940 |
| 2,409,140 | Malcom | Oct. 8, 1946 |

FOREIGN PATENTS

| | | |
|---|---|---|
| 590,094 | Great Britain | July 8, 1947 |

OTHER REFERENCES

Clipping from paper, "The People" (British), Apr. 30, 1950.